Jan. 16, 1968  W. P. LEAR  3,364,369
ELECTRIC MOTOR CONSTRUCTION
Filed Oct. 23, 1965  3 Sheets-Sheet 1
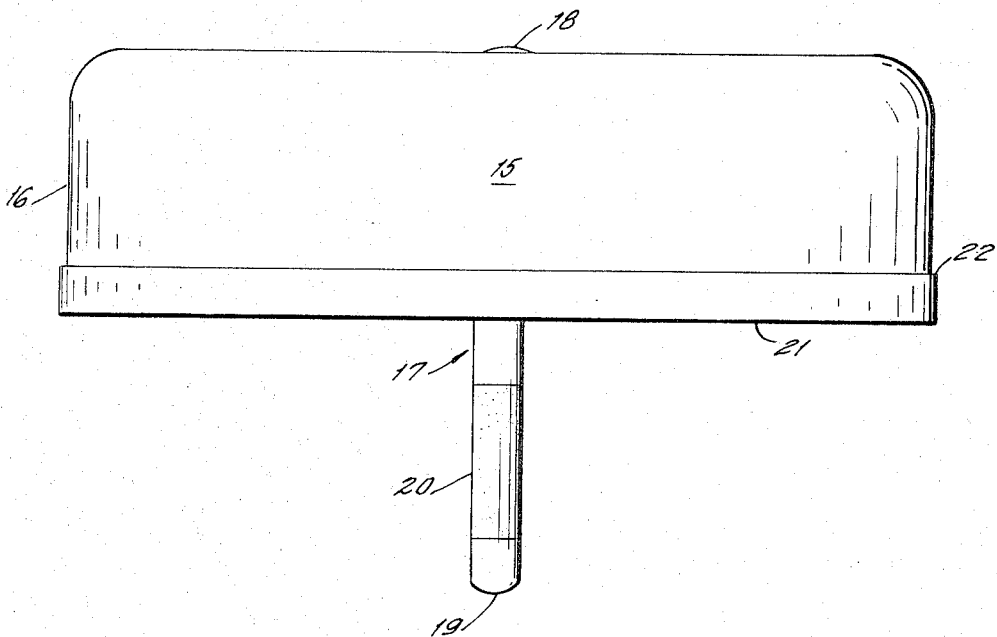
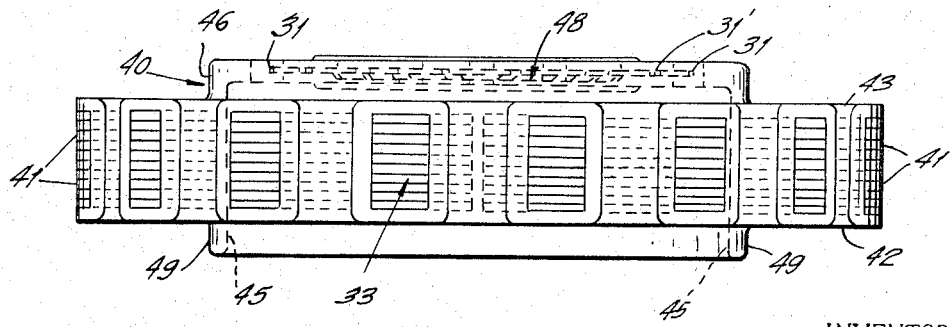
INVENTOR,
WILLIAM P. LEAR
BY Richard A. Marse
his attorney

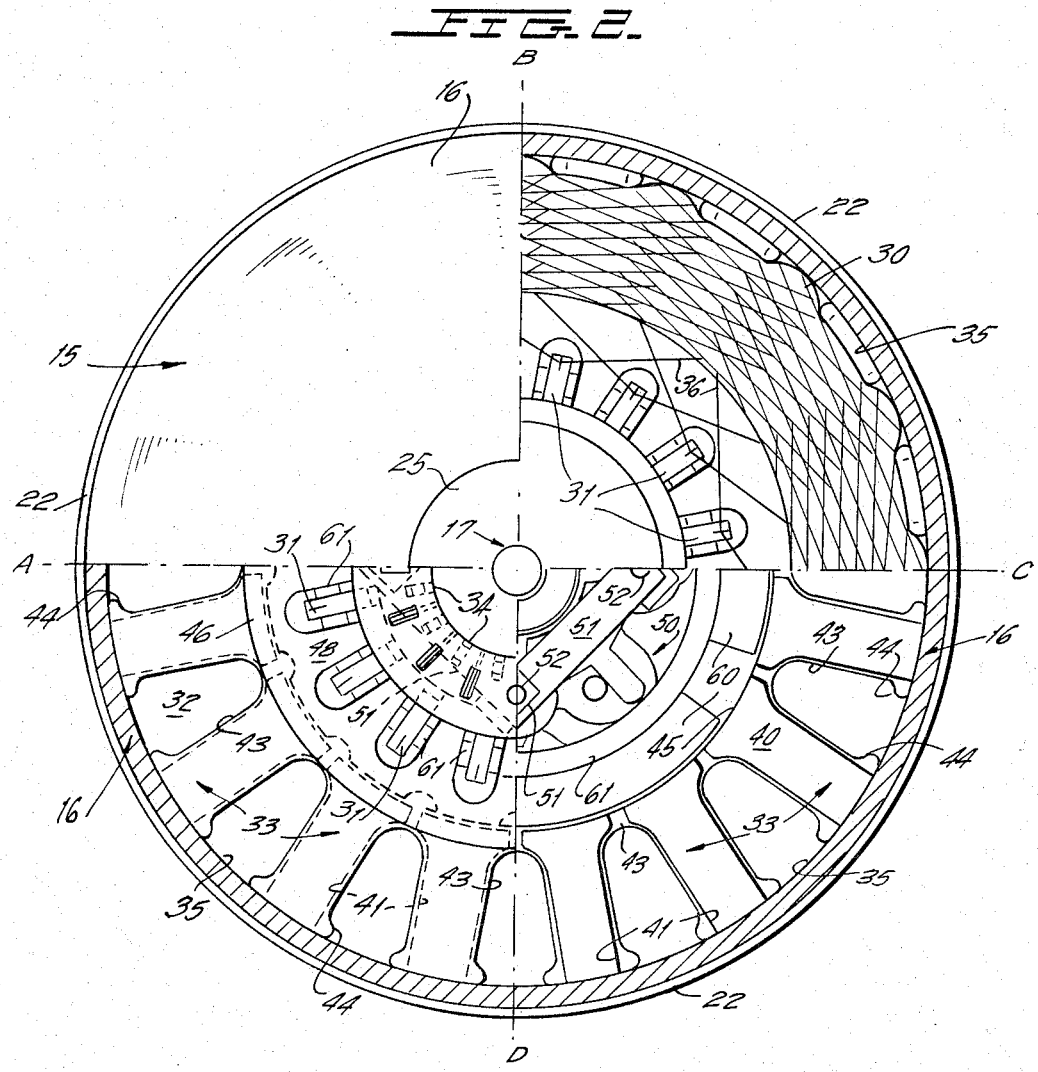
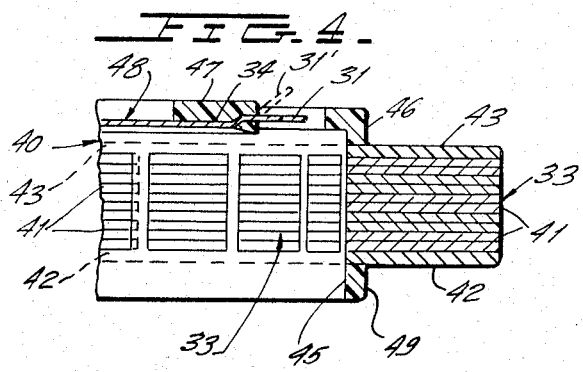
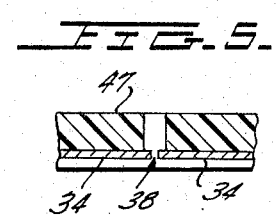
INVENTOR,
WILLIAM P. LEAR

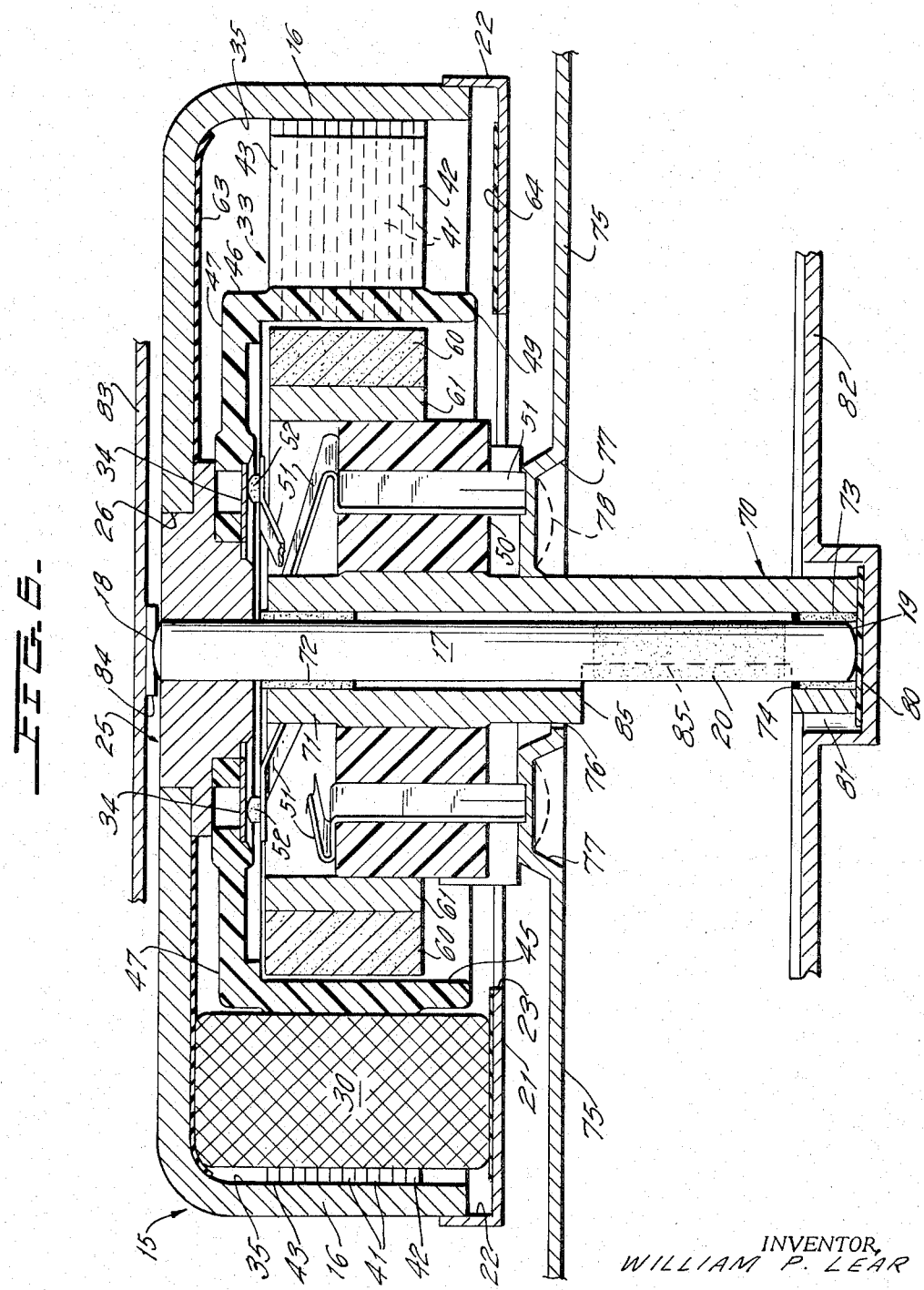

United States Patent Office 3,364,369
Patented Jan. 16, 1968

3,364,369
ELECTRIC MOTOR CONSTRUCTION
William P. Lear, Wichita, Kans., assignor to Lear Jet Industries, Inc., a corporation of Delaware
Filed Oct. 23, 1965, Ser. No. 503,063
9 Claims. (Cl. 310—74)

This invention relates to electric motor construction, and more particularly to novel electric motor arrangements and assembly, as well as to novel production methods therefor.

The present invention is directed to relatively low cost electric motors suitable for smooth direct drive of magnetic tape in recorder and/or player systems. The motor shaft is secured to its outer shell that also serves as a flywheel for the system. The shaft, at slow rotational speed, serves as the drive capstan for the tape. The elimination therewith of gearing, belt drives and flywheel from prior art systems enables a more compact mechanism and the virtual elimination of wow and flutter in the acoustic reproduction. Such system is shown in the copending patent application for "Combination Radio and Magnetic Cartridge Player" of which I am coinventor, Ser. No. 392,212, filed on Aug. 26, 1964, and assigned to the same assignee.

The electric motor construction of my present invention comprises further improvements upon the motors shown and described in my patent "Self-Shielding Motor" No. 3,329,845 issued on July 4, 1967, assigned to the assignee hereof. Essentially, the electric motor arrangement herein incorporates the whole of the armature laminations and winding secured within a cup-shaped shell as a unitary rotor, with the central stationary stator comprising a composition annular core carrying permanent magnet segments that coact with the armature. A central sleeve bearing in the core rotatably supports a shaft that extends centrally from the rotor. Electrical current is supplied to the concentric armature through brushes springmounted on the stationary core. In the direct current version of the motor, a commutator is arranged with the armature assembly; in the alternating current version, slip rings may be used. The novel features hereof may also be used in the construction of comparable electric generators.

The motor hereof provides substantial rotational inertia for its rotor and drive shaft. Most of the motor's mass is arranged in the rotor, concentrically about the stationary core. Thus for a given amount of material and bulk, the motor arrangement of this invention affords maximum rotational inertia and output drive stability. Conversely, for a desired amount of rotational inertia in a drive system, the motor of the present invention provides it at minimum motor weight, volume and cost, as well be set forth hereinafter. Such motor eliminates the need for a separate flywheel. The moment of inertia factor is built right into the rotor, with minimum added material cost, and low labor content. The motor assembly hereof lends itself to efficient mass-production processing. It is compact and effective as a direct magnetic tape drive, its shaft serving as capstan. Its symmetry and ease of its production control results in constant angular velocity without need to dynamically balance its rotor. Further, when operated at low rotational speed, e.g. in the order of 5 revolutions per second, its smooth drive is emphasized, with resultant excellent acoustic reproduction.

The above and other features, advantages and objects of this invention will become more apparent from the following description of an exemplary embodiment thereof, illustrated in the drawings, in which:

FIG. 1 is an elevational view of the exemplary motor, without an extending sleeve bearing.

FIG. 2 is a diagrammatic plan view of the exemplary motor, with quadrants thereof shown at different levels to illustrate its internal construction.

FIG. 3 is a side view of a sub-assembly of the motor, being the lamination portion of its armature.

FIG. 4 is a vertical cross-sectional view through the sub-assembly of FIG. 3.

FIG. 5 is an enlarged cross-sectional view transversely through an adjacent pair of commutator segments in the sub-assembly of FIGS. 3 and 4.

FIG. 6 is an enlarged vertical cross-section through the exemplary motor, the armature laminations being shown at the right side.

The motor 15 is a direct current type, with a commutator. As stated hereinabove, the general concept and arrangement of the invention motor is also applicable to alternating current types. Its outer shell 16 is characteristic of the motor, being rotatable as part of its rotor assembly. Shell 16 is cup-shaped. It provides a substantial part of the rotational inertia of the rotor assembly. Shell 16 is made of cold rolled steel, pressed sintered powdered iron, or equivalent metallic material. Shell 16 is part of the armature magnetic system that is secured thereto and rotates therewith. The axial shaft 17 extends through the motor with a shallow rounded tip 18 projecting at the top. The bottom tip 19 of shaft 17 also is rounded with a shallow curvature. Rounded tips 18 and 19 of the shaft are externally supported; tip 19 on a thrust bearing to be described (see FIG. 6). A central portion 20 of shaft 18 is vapour blasted for better traction when used to transport magnetic tape. An annular shield 21 with a flanged rim 22 is secured to the bottom of shell 16; its opening 23 extends beyond the rotor assembly, see FIG. 6. The exemplary material for shield 21 is cold rolled template steel, as 0.030″ thick. Shield 21 is preferably magnetically degaussed before assembly on the motor.

In FIG. 2, the AB quadrant is a plan view of the motor shell 16, showing tip 18 of shaft 17 protruding. Shaft 17 is firmly secured with shell 16 through central steel insert 25. Insert 25 is proportioned with a top annular projection 26 that seats concentrically into a companion aperture in the center of shell 16. Insert 25 is press-fitted and staked securely with shell 16. The upper end of shaft 17 is secured firmly concentrically within insert 25. Stable assembly of the shaft 17 to shell 16, with close concentricity, assures dynamic smoothness and balance of the motor output. Similarly, uniform and symmetrical construction of the armature assembly, and its concentric mounting within the shell 16, results in uniform angular velocity and no need for dynamic balancing of the motor.

Quadrant BC of FIG. 2 is a plan view of the armature winding 30 and commutator connection tips or tangs 31, 31. There are four poles and sixteen armature slots 32 and laminated segments 33, 33. Four tangs 31, 31 are in each quadrant, with their corresponding integral individual flat commutator segments 34, 34 in symmetrical circular array. The winding 30 is contained between the inner rim 35 of shell 16 and slots 32, 32 about laminated segments 33, 33. Nevertheless, by the advantageous method and construction of the present invention, the winding 30 is "externally" wound by normal automatic winding machinery, as set forth hereinafter. The normal connections between the armature winding (30) and the commutator are effected through the wire loops 36, 36 engaging the slitted tips of tangs 31, 31. In practice, the tips 31 are first bent out of the lamination assembly (40), as shown in dashed lines at 31′ in FIGS. 3 and 4. The winding proceeds with loops 36, 36 being attached to tangs 31, 31. They are thereupon soldered together, and the tangs bent back into place.

Quadrant CD of FIG. 3 illustrates the "spider" assembly 40 of the armature within shell 16, the stator core assembly 50 central of the motor, and the permanent magnet sectors 60, 60. The spider assembly 40 comprises the radial laminated segments 33, 33 molded together, as an integrated body. After the winding 30 is formed on it the whole armature assembly is either press-fitted and secured in position within the rim 35 of shell 16, or is suitably adhered thereat by epoxy cement or resin. A small insulation spacing, as 0.001″, between segments 33, 33 and the shell does not materially affect the overall efficiency of the motor. The spider assembly 40 with windings 30 thereon, bonded to the interior of shell 16 constitutes the predominant rotational mass of the rotor. The commutator segments 34, 34, shaft 17 and bottom shield 21 complete the rotor assembly.

Quadrant CD shows the individual laminations 41, 41 with which the radial sectors 33, 33 are built-up. The laminations 41, 41 are secured together with suitable overall molding material. The laminations 41, 41 are stacked between a bottom lamination ring 42, and a top one 43. Lamination rings 42 and 43 are flat stampings of cold rolled steel with a central annular hub and a radial extension for each segment 33. Their tips 44, 44 adjacent shell 16 are optionally flared out to support the molding matrix. The upper lamination ring 43 appears in quadrant DA, and both rings are shown in cross-sectional FIG. 4. The internal cylindrical surface 45 of winding-lamination assembly 40 is spaced with a suitable clearance, as 0.020″, from the magnet ring 60, 60 to constitute the motor air gap.

The composition core 50 is stationary and mounts the four brush spring arms 51, 51 at the tips of which are welded or soldered silver-graphite brushes 52, 52. Spring arms 51, 51 press brushes 52, 52 up against the flat commutator segments 34, 34; the brushes being 90° apart. The permanent magnets 60, 60 are spaced apart on a metal annular ring 61. Ring 61 may be of suitable soft magnetic iron or steel efficient in magnetic flux passage; or may be formed of sintered powdered iron pressed into the ring form. Ring 61 is secured to core 50; and the sector magnets 60, 60 suitably adhered to the ring. This constitutes the motor magnetic pole assembly, held stationary herein. Suitable permanent magnetic material with high coercive force is used for segments 60, 60, as "Index" No. 2 of the Indiana General Company.

Quadrant DA is taken above the level of core 50 and brushes 52. The upper lamination ring 43 is seen, with laminations 41 in dashed lines underneath. The overall molding rim 46 at the upper spider assembly 40 appears in this quadrant, and in cross-section in FIGS. 4 and 6. Molded rim 46 extends across the upper level of assembly 40, as layer 47, with the commutator assembly 48 molded therein. This is accomplished by initially inserting the commutator as a unitary stamping in suitable position; jigs used for the lamination stacking could also hold this unit. The molding material is one having good insulation and mechanical properties, as commercially known "Glastic" No. 1602, or equivalent. The molding material is formed with an annular extension 49 below the level of lamination ring 42. A unitary commutator insert is molded-in flat. It is then trimmed-off to provide individual segments (34) with integral tangs (31). The flat segments 34, 34 are in a common plane and exposed to the brushes (52) mounted just below; see FIGS. 4, 5 and 6. They are radial and spaced apart, as shown at 38 in FIG. 5.

The spider assembly 40 is shown in FIG. 3. It is molded into an integral cylindrical array, with radially extending laminated segments 33, 33, with commutator 48 central thereof. In the exemplary motor sixteen coils of 130 turns each are wound thereon, using a balanced lapwound symmetrical coil configuration. Automatic winding machinery is usable on the inside-out type motor construction of this invention. A double-flyer winder may present two coils at a time on segments 33, 33. The economy of mass production winding is thus available for the motors hereof. Copper "Nyleze" wire, gauge 28, is typically used. The commutator tab ends or tangs 31 first are bent-up to 31′ as aforesaid, and then bent back after the coil winding, to remain within openings in layer 47, for electrical safety. Also, an insulation layer 63 is adhered to the inner face of shell 16 above the armature, and a layer 64 on the inside surface of shield 21 to prevent short circuiting of the windings 30.

The combined spider (40) with winding (30) member is then secured within the shell 16 as aforesaid. It is suitably cemented-in or press-fitted, to form a unitary rotor assembly therewith. The shell 16 may be formed as a cup-shaped unit, as shown, of suitable mass to produce the requisite moment of inertia for the drive system. In other words, with a given spider-winding sub-assembly configuration and weight, the rotor rotational inertia can be determined by proportioning of the shell (16) that provides the balance. The shell height and wall thickness determines its contribution to the resultant moment of inertia. The material and thickness used also determines the magnetic efficiency of the shell as part of the magnetic structure with the armature. Its magnetic quality may be improved by the insertion of an annular ring of magnetically higher grade steel between the spider (40) assembly and the shell (16).

The exemplary motor has a shell 4.6″ in outer diameter, 1.25″ in height. With its contained armature assembly, its moment of inertia is of the order of 180 oz.-(in.)$^2$. This rotational parameter can be decreased by reducing the weight and/or configuration of the shell, as by slotting its upper face radially, or by reducing its thickness, or both. Conversely it may be increased by the use of thicker walls. At 286 r.p.m. nominal, the torque at shaft (17) output is of the order of 4 in.-oz. Its starting-up torque is about 14 in.-oz., with a starting current surge of 1.5 amperes at 8 volts. The relatively thick steel shell 16 surrounds the commutator, armature and brushes. It serves as a good shield for the electromagnetic disturbances produced therein by the normal operation of the commutator. The normal operating current of the exemplary motor is about 0.400 ampere, at 286 r.p.m. with the order of 6 volts applied.

The use of material of good magnetic quality for laminated segments 33, 33 and the shell 16 reduces the motor operating current level by reducing eddy current and hysteresis losses in the iron. Lower magnetic efficiency would increase such current for a given motor output. The few watts required in its operation is readily dissipated in the sizable motor hereof, and it thus runs cool. The laminations 41, 41 comprising the radial armature segments 33 are pressed of sintered powdered iron to their final shape. Ten such laminations (41) are stacked in each segment between the radial arms of lamination rings 42, 43. Fewer or more laminations are used depending upon the material used and efficiency desired. The use of sintered powdered iron with 3% silicon content for the laminations 41 improves the motor efficiency, and reduces the normal running current.

An axial sleeve bearing 70 is arranged centrally of composition stator core 50. The cylindrical sleeve 71 is molded to the center of core 50 as shown in FIG. 6. Sleeve bearing elements 72 and 73 are disposed at the ends of sleeve 71 to rotatably hold shaft 17 therein. A felt ring 74 on bearing 73 serves as a dirt barrier. Bearings 72, 73 may be bronze or "oilite" type. The sleeve 71 is preferably of steel to provide rigid support to the rotor at shaft 17. In assembly, the stator is first secured in position in the mechanism, as on the reference motor plate 75. An aperture 76 in plate 75 controls the centering of the motor. The sleeve 71 is inserted in hole 76. The composition stator core 50 is thereupon located over bumps 77, 77 upset in plate 75. Suitable machine screws 78, 78 indicated in dashed lines secure core 50 with plate 75.

The rotor is mounted over core 50, by its shaft 17 being inserted in sleeve bearing 70. The bottom tip 19 of shaft 17 reposes on a pad 80, as of "nylon" or "Delrin," constituting a stable thrust or end bearing for the shaft. Pad 80 is adhered to a well (81) in reference bottom chassis plate (82). The cover (83) of the apparatus contains an insert (84) that is pressed on the rounded top tip 18 of the shaft for further bearing stability for the rotor shaft. The sleeve 71 contains a cut-out region indicated at 85 to expose the shaft 17 for engagement with the magnetic tape (not shown). Its roughened surface 20 improves its drive thereof as aforesaid. A modification for the motor shaft extension is shown in FIG. 1, wherein the sleeve bearing for the shaft is fully within the body of the motor.

Although this invention has been described in connection with an exemplary embodiment, it is to be understood that variations and modifications thereof are feasible within the broader spirit and scope of the invention, as set forth in the following claims.

What is claimed is:

1. An electric motor of the fly wheel type comprising an exterior shell of ferro-magnetic material, a shaft extending axially of said shell, an armature in toroidal form having radial segments with winding means thereon, said shell surrounding said armature with its segments in magnetic coaction with the shell, said shell and armature being joined together in concentric array and constituting the rotor of the motor, connection means for energizing the winding means, a stator composed of a hub with a sleeve bearing mounted axially therein for rotationally supporting said shaft and the rotor therewith, and permanent magnet means in sectional form mounted about said hub for electromagnetic coaction with said armature, said rotor containing the predominant mass of the motor and being proportioned to yield a relatively high rotational inertia.

2. A direct current motor of the fly wheel type having relatively high rotational inertia comprising a cup-shaped shell incorporating a cylindrical band of ferro-magnetic material, a shaft extending axially of said shell and secured centrally thereto, an armature formed in a unitary toroidal arrangement containing radial segments with winding means thereon, said shell surrounding said armature with its segments in close magnetic coaction with said cylindrical band, said shell and armature being joined together in concentric array and with said shaft constituting the rotor of the motor, connecting means for energizing the winding means, a stator composed of a hub with a sleeve bearing mounted axially therein for rotationally supporting said shaft and the rotor therewith, and sections of permanent magnetic material mounted about said hub for electromagnetic coaction with said armature.

3. An electric motor as claimed in claim 1, in which said armature segments are physically separated as radial units and support winding portions of said winding means and each radial segment is composed of a plurality of juxtaposed laminations.

4. An electric motor as claimed in claim 1, in which each radial armature segment is composed of a plurality of individual juxtaposed laminations of sintered powdered iron.

5. An electric motor as claimed in claim 1, further including a pair of spaced lamination rings holding said armature segments therebetween with bonding material securing said segments with the rings.

6. An electric motor as claimed in claim 4, further including bonding material securing said armature segments and their laminations in said toroidal form and radial array, the outer segment portions being substantially wider apart than the radially inner portions thereof.

7. A motor as claimed in claim 6 wherein the connecting means includes a commutator bonded with said armature, said commutator being concentric with the toroidal form and having its contacts oriented in a plane normal to the shaft.

8. A motor as claimed in claim 7, wherein the connection means also includes brush means extending from said hub into operative connection with said commutator, said commutator and brush means being positioned adjacent the shell material for electromagnetic shielding thereof.

9. A motor as claimed in claim 8, in which said brush means includes a plurality of leaf springs each with one end fastened to said hub and their other ends mounting individual brushes into firm stable engagement against the flat commutator contacts.

References Cited

UNITED STATES PATENTS

| | | | |
|---|---|---|---|
| 1,796,556 | 3/1931 | Boitel | 310—67 |
| 2,071,953 | 2/1937 | Schov | 310—74 |
| 3,329,845 | 7/1967 | Lear | 310—67 |
| 3,140,413 | 7/1964 | Terry | 310—74 |

MILTON O. HIRSHFIELD, *Primary Examiner.*

J. D. MILLER, *Assistant Examiner.*